United States Patent [19]
Parker et al.

[11] Patent Number: 6,138,998
[45] Date of Patent: Oct. 31, 2000

[54] SPACECRAFT ANTENNA SLEW CONTROL SYSTEMS

[75] Inventors: A. Dale Parker, Rolling Hills Estates; Emil M. Shtarkman, Marina Del Rey; Kathleen M. Doherty, Rancho Palos Verdes, all of Calif.

[73] Assignee: TRW Inc., Redondo Beach, Calif.

[21] Appl. No.: 09/076,499

[22] Filed: May 12, 1998

[51] Int. Cl.[7] ....................................................... F16F 5/00
[52] U.S. Cl. .............................. 267/140.15; 188/267.1; 343/DIG. 2
[58] Field of Search ....................... 343/DIG. 1, DIG. 2, 343/874, 875; 188/267, 267.1, 267.2, 266.1, 266.7; 267/140.14, 140.15

[56] References Cited

U.S. PATENT DOCUMENTS

| | | | |
|---|---|---|---|
| 2,510,059 | 6/1950 | Black | 343/DIG. 1 |
| 3,826,339 | 7/1974 | Brokaw | 343/DIG. 1 |
| 4,259,825 | 4/1981 | Hedgepeth et al. . | |
| 4,578,920 | 4/1986 | Bush et al. . | |
| 4,819,399 | 4/1989 | Onoda . | |
| 4,869,476 | 9/1989 | Shtarkman . | |
| 4,896,752 | 1/1990 | Shtarkman . | |
| 4,942,947 | 7/1990 | Shtarkman . | |
| 4,958,474 | 9/1990 | Adams . | |
| 4,992,190 | 2/1991 | Shtarkman . | |
| 5,022,272 | 6/1991 | Bronowicki et al. . | |
| 5,167,850 | 12/1992 | Shtarkman . | |
| 5,176,368 | 1/1993 | Shtarkman | 267/140.14 |
| 5,257,681 | 11/1993 | Shtarkman et al. . | |
| 5,305,507 | 4/1994 | Dvorsky et al. . | |
| 5,354,488 | 10/1994 | Shtarkman et al. . | |
| 5,367,459 | 11/1994 | Shtarkman et al. . | |
| 5,424,596 | 6/1995 | Mendenhall et al. . | |
| 5,517,096 | 5/1996 | Shtarkman et al. . | |
| 5,525,853 | 6/1996 | Nye et al. . | |
| 5,655,757 | 8/1997 | Starkovich | 267/140.15 |
| 5,921,357 | 7/1999 | Starkovich et al. | 188/267.2 |

OTHER PUBLICATIONS

"An Actively Damped Passenger Car Suspension System With Low Voltage Electro–Rheological Magnetic Fluid", Andrew Pinkos, Emil Shtarkman, and Thomas Fitzgerald, SAE International Congress and Exposition, Detroit, Michigan, Mar. 1–5, 1993.

Primary Examiner—Robert J. Oberleitner
Assistant Examiner—Robert A. Siconolfi
Attorney, Agent, or Firm—Michael S. Yatsko

[57] ABSTRACT

A motion control apparatus is provided for controlling oscillations of an appendage 10 coupled to a spacecraft 12. A plurality of guidelines 20 extend between remote portions 22 of the appendage 10 and the appendage base 14. A plurality of motion control elements 28 are interposed between the appendage base 14 and the spacecraft 12 and/or along the guidelines 20 between the appendage base 14 and the remote portions 22 of the appendage 10 or both. The motion control elements 28 include visco-elastic fluid, electro-rheological fluid, magnetic-rheological fluid, or a piezo-electric stack so that a motion control property of the motion control elements 28 may be varied according to the magnitude of an electric or magnetic field source 30 coupled thereto.

23 Claims, 2 Drawing Sheets

SPACECRAFT ANTENNA SLEW CONTROL SYSTEMS

BACKGROUND OF THE INVENTION

1. Technical Field

The present invention generally relates to motion control mechanisms and, more particularly, to an apparatus for controlling the vibration of an appendage which results from the slewing of a spacecraft or other disturbances.

2. Discussion

Spacecraft are commonly provided with deployable antennas, test equipment, and other appendages. For example, spacecraft antennas typically comprise a dish-like shaped structure formed about a central feed tower. In one such reflector design, the feed tower is secured to the spacecraft at its base while a reflective mesh structure is supported about the axis of the feed tower by a rib structure. A plurality of cables interconnect the remote portions of the dish-like structure with the base of the feed tower. These cables stabilize the ribs by holding the reflective mesh surface in place.

Spacecraft maneuvers such as slewing (i.e., rotating the spacecraft about its yaw or pitch axis) and/or spacecraft disturbances cause the appendages extending therefrom to undergo undesirable oscillations. Typical large diameter reflective structures possess low natural frequencies (1.0 Hz or less) and inherent structural damping of such systems accounts for approximately 0.1% to 0.4% critical damping. Because of the low damping, the antenna requires a significant amount of time to settle down. Prior to settling, the antenna's mission operation is degraded.

Prior art attempts to reduce oscillations have been directed towards stiffening the overall antenna structure. By stiffening the structure, the natural frequency of the antenna can be increased. As such, the oscillations occur faster and the time required for the vibration displacements to drop to an acceptable level is reduced. One method that has been used to increase frequency was to increase the tension in the guidelines extending between the rib structure and the feed tower base. Also, cables have been added from the top edge of the rib structure to the top of the feed tower and the diameter of the ribs has been increased. However, these attempts have been only modestly effective as the natural frequency cannot be increased to a sufficient level without adding significant weight to the structure.

Motion control mechanisms for damping oscillations have been used to various degrees in the automotive industry. For instance, U.S. Pat. No. 4,869,476 entitled "Electrically Controlled Viscous Elastic Spring" to Shtarkman and assigned to the Assignee of the present invention and incorporated by reference herein describes a spring for resisting relative movement of parts and for urging the parts to an initial, equilibrium position when the parts are moved therefrom. The spring uses a fluid, such as an electro-rheological fluid or a magnetic fluid, to provide a variable spring rate and a variable load-carrying capacity. The resistance to flow of these fluids varies as a function of the magnitude of either an electric field or a magnetic field applied to the fluid.

Another known device using electro-rheological fluid for damping is disclosed in U.S. Pat. No. 4,896,752 entitled "Vehicle Strut" to Shtarkman and assigned to the Assignee of the present invention which is also incorporated by reference herein. This reference discloses a strut for use in a suspension system wherein the spring and damping characteristics of the strut are controlled, in part, by an electro-rheological fluid disposed within fluid chambers in the strut. When the viscosity of the fluid is varied by changing the magnitude of the electric field applied to the fluid, the spring rate of the strut is varied.

Further, U.S. Pat. Nos. 4,942,947, 4,992,190, 5,167,850, and 5,176,368, all to Shtarkman, and U.S. Pat. Nos. 5,257,681, 5,354,488, 5,367,459, 5,517,096, and 5,655,757 all to Shtarkman, et al., each of which is assigned to the Assignee of the present invention and is incorporated by reference herein, disclose devices utilizing fluid compositions which are responsive to an electric or magnetic field. By controlling the magnitude of the field, the spring and damping characteristics of the devices can be manipulated.

In view of the foregoing, it would be desirable to provide an apparatus for damping vibrations in a spacecraft appendage utilizing a control mechanism responsive to an electric or magnetic field.

SUMMARY OF THE INVENTION

The above and other objects are provided by a motion control apparatus for damping oscillations of an appendage such as an antenna coupled to a platform such as a spacecraft. The antenna is secured to the spacecraft at its base so as to extend laterally from the spacecraft. A plurality of guidelines extend between remote portions of the antenna's reflector structure and the antenna base. When the reflector is subjected to lateral forces due to a slew maneuver of the spacecraft or other disturbances, the guidelines react to the lateral loads. When the reflector oscillates in its first lateral mode, the guidelines experience a significant portion of the strain energy for that mode, as does the feed tower. Therefore, in order to reduce the settling time of the antenna relative to the spacecraft, a plurality of motion control elements are provided between the antenna base and the spacecraft, along the guidelines between the antenna base and the remote portions of the antenna or both. The motion control elements preferably comprise either passive or active control elements and include a material having a damping response changed according to the magnitude of an electric or magnetic power source coupled therewith. For instance, the motion control elements may include a magneto- or electro-rheological fluid having its viscosity changed according to the magnitude of an electric or magnetic field applied thereto. Also, the motion control elements may include a piezo-electric stack having its dimensions changed according to the magnitude of an electric field supplied thereto. As such the piezo-electric stack induces a force counteractive to a sense force which results in damping in a structure.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which.

DETAILED DESCRIPTION OF THE PREFERRED EMBODIMENTS

The present invention is directed towards a motion control apparatus for decreasing the settling time of a spacecraft appendage after it experiences vibration due to spacecraft maneuvers or other disturbances. According to the present invention, a motion control element is interposed between the appendage base and the spacecraft and/or along guidelines between the appendage base and remote portions of the appendage. The motion control elements preferably comprise either passive or active control elements and include a material having a damping response changed according to the magnitude of an electric or magnetic power source coupled thereto.

Figure 1:
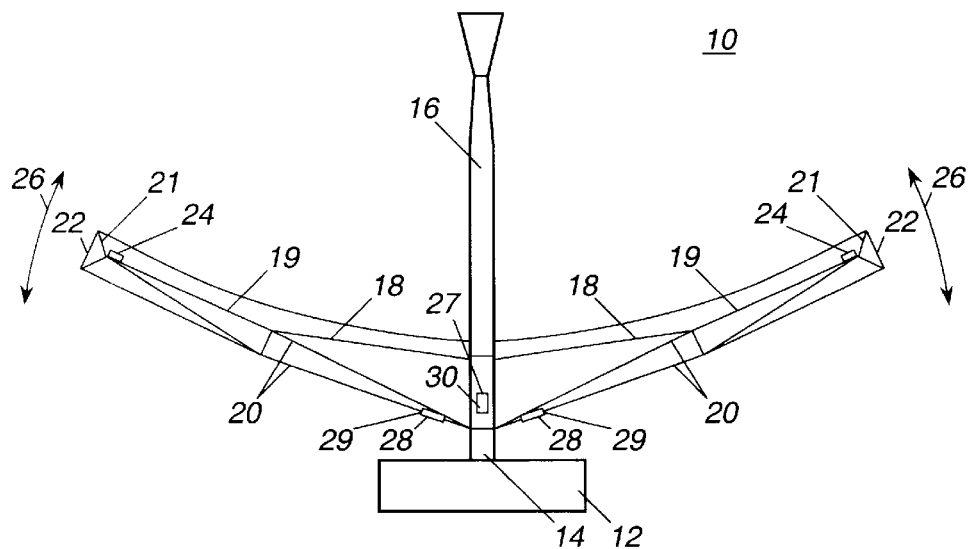
FIG. 1 is a schematic, side, elevational view of a spacecraft antenna incorporating the motion control system of the present invention.

Turning now to the drawing figures, FIG. 1 illustrates a motion control system according to one preferred embodiment of the present invention. A spacecraft appendage in the form of an antenna 10 is coupled to a platform in the form of a spacecraft 12, at the antenna base 14. The antenna 10 includes an elongated, tubular feed tower 16 supporting a foldable dish-like structure 18 thereabout. The dish-like structure 18 includes a plurality of radially projecting ribs 19 pivotally coupled at a first end to the feed tower 16 and coupled at a second end to a spreader bar 21. When deployed, the dish-like structure 18 forms a concave reflector opening away from the spacecraft 12.

A plurality of guidelines 20 in the form of cables extend under tension between the antenna base 14 and remote portions 22 of the antenna 10 along the dish-like structure 18. A plurality of sensors 24, such as accelerometers, are periodically disposed on the dish-like structure 18 proximate the remote portions 22 of the antenna 10. The sensors 24 detect oscillations of the antenna 10 relative to the spacecraft 12 as indicated by the double-headed arrows 26. Further, a deformation sensor 27 is coupled to the base of the feed tower 16 and strain sensors 29 are interposed along the guidelines 20 for detecting the oscillations 26.

A deformation sensor is a sensor/actuator device including a plurality of piezo-electric elements therein. Some of the piezo-electric elements are used in a sensing mode to generate an electric charge proportional to the magnitude of the stress generated by an applied force. Other piezo-electric elements are used in an actuator mode by generating mechanical forces proportional to the magnitude of an electric charge supplied thereto. As such, the deformation sensor 27 can sense the level and frequency of oscillations of the antenna 10 while reacting to damp the same. A more detailed description of the deformation sensor 27 can be found in U.S. Pat. No. 5,424,596 entitled "Activated Structure" to Mendenhall et al., U.S. Pat. No. 5,525,853 entitled "Smart Structures for Vibration Suppression" to Nye et al., U.S. Pat. No. 5,022,272 entitled "Locally Compensated Deformation Sensor" to Bronowicki et al., and U.S. Pat. No. 5,305,507 entitled "Method for Encapsolating a Ceramic Device for Embedding in Composite Structures" to Dvorsky et al., assigned to the Assignee of the present invention which are hereby incorporated by reference herein.

In the embodiment illustrated in FIG. 1, a plurality of motion control elements 28 acting as energy dissipators are aligned along the critical load paths of the antenna 10. More particularly, the motion control elements 28 are interposed in parallel or series along select guidelines 20 between the antenna base 14 and the remote portions 22 of the antenna 10. If desired, more than one motion control element 28 may be interposed in series along the same guideline 20. As described in greater detail below, the motion control elements 28 actively and/or passively attenuate the oscillating motion 26 of the antenna 10 which may arise as a result of spacecraft maneuvers and/or other disturbances. Because the motion control elements 28 dissipate the oscillation energy at a higher rate than in their absence, the oscillation motion 26 is quickly settled.

Figure 2:
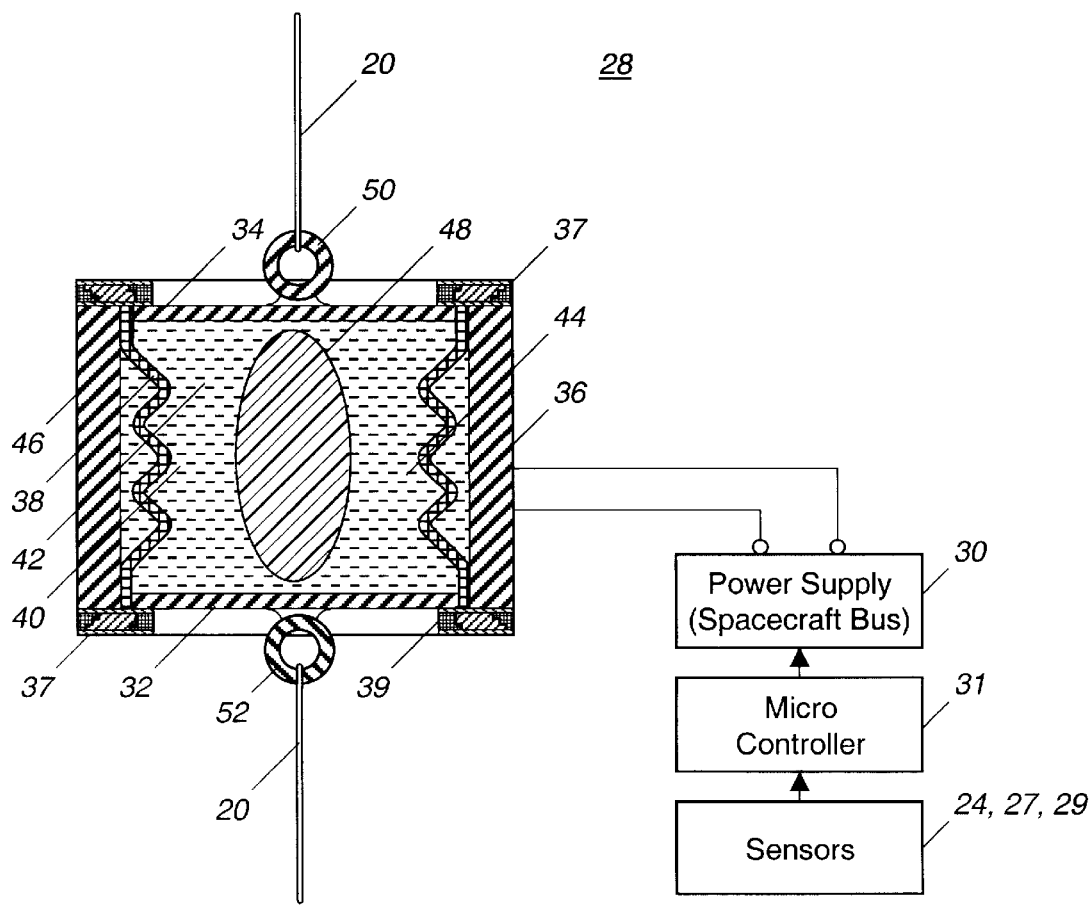
FIG. 2 is a schematic view of an exemplary motion control element for use in the motion control system of the FIG. 1.

Turning now to FIG. 2, an exemplary embodiment of a motion control element 28 is illustrated. The motion control element 28 includes a cylindrical housing 32 having a non-conductive cylindrical inner member 34 substantially residing within and axially aligned with an electro magnet 36. A pair of non-conductive end caps 37 retain the inner member 34 within the electro magnet 36. The inner member 34 includes a flexible (e.g., metal or rubber) bellows portion 38 forming a portion of its side wall which is free to expand and compress axially relative to the electro magnet 36. As such, expansion and compression of the inner member 34 is accommodated by the flexing and collapsing of the flexible bellows portion 38. The cable 20, which is connected at 50 and 52 to end fittings of the inner member 34, cause the inner member 34 to elongate via the bellows 38 when a load is applied.

The inner volume 42 of the inner member 34 forms a fluid chamber 40 filled with a fluid 44 which, as described below, has its viscosity varied according to the magnitude of an electric or magnetic field to which it is exposed. A source 46 for providing such a magnetic or electric field is coupled to the outer member 36 so as to surround or at least be on opposite sides of the inner member 34. A closed cell foam bladder 48 is disposed within the inner volume 42 of the inner member 34 to absorb loads directed on the housing 32 while keeping the fluid 44 against the flexible bellows portion 38.

A power source 30 is coupled to the source 46 via a microprocessor 31. The microprocessor 31 also communicates with one or more of the sensors 24, deformation sensor 27 and/or strain sensors 29 (FIG. 1) by telemetry or a conventional wiring harness. As such, the microprocessor 31 controls the power source 30 in response to signals received from the motion control sensors 24, 27 and/or 29. The characteristics of each motion control element 28 is controlled independently by the microprocessor 31 to counter the lateral forces described above.

Preferably, the fluid in the motion control elements 28 comprises an electro-rheological fluid or a magneto-rheological fluid. An electro-rheological fluid is a two-phase material which has its resistance to flow varied as a function of an electric field acting on the fluid. A magneto-rheological fluid is a two-phase material which has its resistance to flow varied as a function of a magnetic field acting on the fluid. Alternatively, a visco-elastic fluid may be used in the motion control elements 28 in combination with or independent of the electro- or magneto-rheological fluid. By employing these types of fluids, the spring and damping properties of the motion control element 28 may be variably controlled.

More specifically, the electric or magnetic field acting on the fluid 44 in the motion control element 28 has a strength proportional to the voltage potential across source 46. The resistance to flow of the fluid 44 is proportional to the strength of the field applied across the fluid 44 in the inner volume 42 of the inner member 34. Thus, when the voltage from the power source 30 is varied, the resistance to flow of the fluid 44 is varied. When the resistance to flow of the fluid 44 in the inner volume 42 is varied, the damping characteristics of the motion control element 28 is varied. As the resistance to flow of the fluid 44 decreases, the damping rate of the damping element 28 decreases. Similarly, as the resistance to flow of the fluid 44 increases, the damping rate of the motion control element 28 increases. Thus, the damping characteristics of the motion control element 28 are varied and controlled in response to the field applied to the fluid 44 in the inner volume 42.

As just described, one way to vary the strength of the field applied to the fluid 44 in the inner volume 42 is to vary the voltage potential across source 46. Another way to vary the strength of the field applied to the fluid 44 in the inner volume 42 is to change the distance between the source 46 and the fluid 44 in the inner volume 42. Also, the size of the field can be changed by varying the area of the source 46 which is in facing relationship. Accordingly, the actual configuration of the motion control element 28 may be selected to provide the desired damping characteristics corresponding to the specific application into which it is incorporated.

Referring now collectively to FIGS. 1 and 2, in active damping control operation, the sensors 24, deformation sensor 27 and/or strain sensors 29 provide electrical signals to the microprocessor 31 indicative of the vibration conditions, i.e., level and frequency, experienced by the antenna 10. In response to the signals, i.e., feedback, the microprocessor 31 provides output signals to control the power source 30. The power source 30 varies the magnitude of the voltage transmitted to the motion control elements 28 in response to the signals from the sensors 24. By controlling the power source 30, the viscosity of the fluid 44 in the motion control elements 28 is controlled to increase or decrease the damping characteristics of the motion control elements 28. Thus, for active control of the motion control properties of the damping element 28, the fluid 44 preferably comprises a visco-elastic fluid, a magneto-rheological fluid, an electro-rheological fluid, or a combination thereof and the source 46 preferably consists of an electro-magnet, a coil or electric field source and electrodes having a variable voltage supplied thereto, or both.

The motion control element 28 may also be operated in a passive-damping configuration. In this mode, the sensors 24, 27 and 29 are unnecessary and are preferably eliminated to reduce weight and complexity. In this case, a constant voltage from the power source 30 is applied to the fluid 44. As such, the fluid 44 in the motion control elements 28 maintains a constant, preselected viscosity and the motion control elements 28 provide a constant, preselected damping effect. To further reduce complexity, the source 46 may take the form of permanent magnets. In this case, the power source 30 may also be eliminated. Thus, for passive control of the damping characteristics of motion control element 28, the fluid 44 preferably comprises a visco-elastic fluid, a magneto-rheological fluid, an electro-rheological fluid or a combination thereof and the source 46 preferably consists of permanent magnets, a coil having a constant voltage provided thereto, or both.

As a further alternative, the fluid based motion control element 28 illustrated in FIG. 2 may be replaced by a motion control element including one or more piezo-electric damping elements therein (commonly referred to as a PZT stack). A piezo-electric element exerts a mechanical force proportional to the magnitude of an electric field applied thereto. One skilled in the art will appreciate that a PZT stack's function is substantially identical to that of the active fluid based motion control element 28 described above. A further explanation of PZT stack based motion control elements can be found in co-pending U.S. patent application Ser. No., entitled "Spacecraft Antenna Vibration Control Damper", filed concurrently herewith, and assigned to the Assignee of the present invention and incorporated by reference herein.

Figure 3:
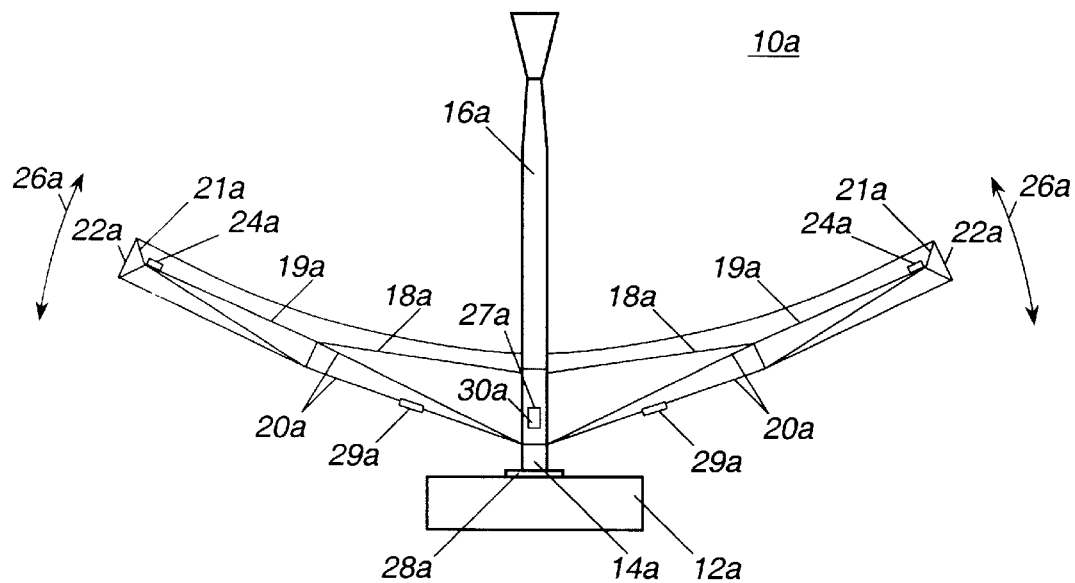
FIG. 3 is a schematic, side, elevational view of a second embodiment motion control system according to the present invention.

Referring now to FIG. 3, an alternate embodiment of the motion control system of the present invention is illustrated. Since this embodiment includes many elements which are identical to those in the first embodiment illustrated in FIG. 1, like reference numerals are used hereinafter to indicate like components. In FIG. 3, a spacecraft antenna 10a is coupled to a spacecraft 12a at the antenna base 14a. The antenna 10a includes an elongated, tubular feed tower 16a supporting a foldable dish-like structure 18a thereabout. The structure 18a includes a plurality of radially projecting ribs 19a pivotally coupled at a first end to the feed tower 16a and coupled at a second end to a spreader bar 21a. As such, the structure 18a forms a deployable concave, reflector opening away from the spacecraft 12a.

A plurality of cable guidelines 20a extend under tension between the antenna base 14a and remote portions 22a of the antenna 10a along the structure 18a. A plurality of sensors 24a, such as accelerometers, are periodically disposed on the structure 18a proximate the remote portions 22a of the antenna 10a. The sensors 24a detect oscillations of the antenna 10a relative to the spacecraft 12a as indicated by the double-headed arrows 26a. Further, a deformation sensor 27a is coupled to the base of the feed tower 16a and strain sensors 29a are interposed along the cables 20a for detecting the oscillations 26a.

In the embodiment illustrated in FIG. 3, at least one motion control element 28a is interposed along a critical load path of the antenna 10a between the antenna base 14a and the space craft 12a. The motion control element 28a acts as an energy dissipator to alter the amplitude of the antenna 10a which effectively reduces oscillation motion 26a. The motion control element 28a actively and/or passively attenuates the motion 26a of the antenna 10a which may arise as a result of spacecraft maneuvers and/or other disturbances.

For active control of the damping characteristics of the motion control element 28a, the motion control element 28a is preferably provided with a fluid in the form of a visco-elastic fluid, an electro-rheological fluid, a magneto-rheological fluid, a combination thereof or a PZT stack as described above with reference to FIG. 1. A power source 30a (FIG. 2) is electrically coupled to the motion control element 28a and a microcontroller 31 communicates with one or more of the sensors 24a, 27a and/or 29a by telemetry or a conventional wiring harness. The remote sensors 24a, 27a and/or 29a provide electrical signals to the microprocessor 31a indicative of the level and phase of the oscillating conditions experienced by the antenna 10a. In response to the signals from the remote sensors 24a, 27a and/or 29a, i.e., feedback, the microprocessor 31a provides output signals to control the power source 30. The power source 30 varies the magnitude of the voltage transmitted to the motion control element 28a in response to the signals from the sensors 24a, 27a and/or 29a. By controlling the power source 30, the damping characteristics of the motion control element 28a are controlled according to the changes in voltage applied thereto.

The motion control element 28a may also be operated in a passive-damping configuration. In this mode, the sensors 24a, 27a and/or 29a are unnecessary and are preferably eliminated. Further, the motion control element 28a preferably includes a fluid therein in the form of an electro-rheological fluid, a magneto-rheological, a visco-elastic fluid or a combination thereof. In this case, permanent magnets, coils, or electrode surfaces receiving a constant electric or magnetic field from the power source 30 provide a constant magnitude of voltage across the motion control element 28a to counter the oscillating 26a of the antenna 10a. As such, the fluid in the motion control element 28a provides a constant, preselected damping effect.

Figure 4:
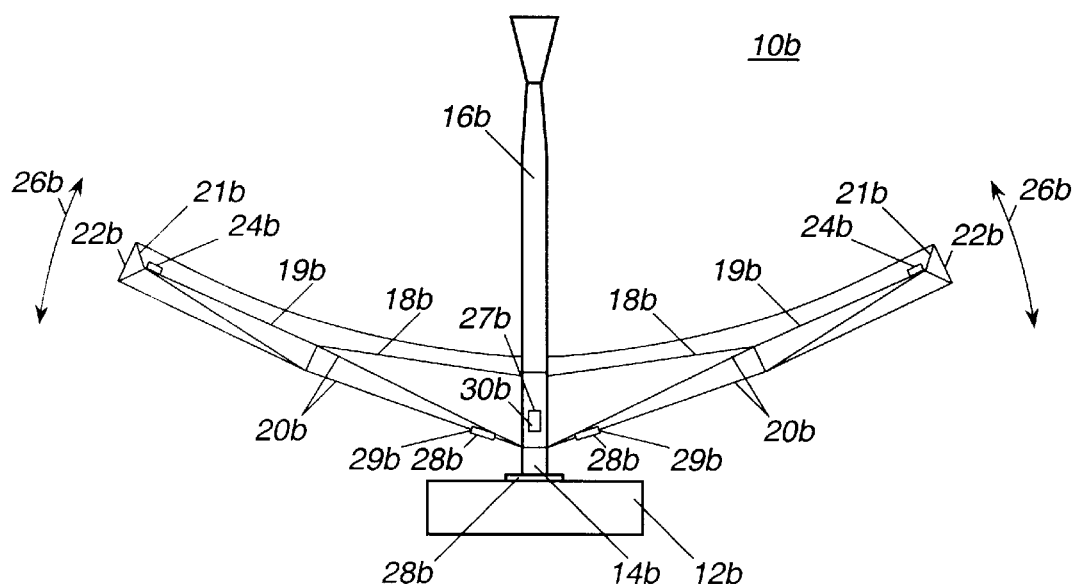
FIG. 4 is a schematic, side, elevational view of a third embodiment motion control system according to the present invention.

Turning now to FIG. 4, a third embodiment of the present invention is illustrated. Again, like reference numerals are used to indicate like components. In FIG. 4, a spacecraft antenna 10b is coupled to a spacecraft 12b at the antenna base 14b. The antenna 10b includes an elongated, tubular feed tower 16b supporting a dish-like structure 18b thereabout. The dish-like structure 18b includes a plurality of radially projecting ribs 19b pivotally coupled at a first end to the feed tower 16b and coupled at a second end to a spreader bar 21b. As such, the structure 18b forms a deployable concave reflector opening away from the spacecraft 12b.

A plurality of cable guidelines 20b extend under tension between the antenna base 14b and remote portions 22b of the antenna 10b along the structure 18b. A plurality of sensors 24b, such as accelerometers, are periodically disposed on the structure 18b proximate the remote portions 22b of the antenna 10b. The sensors 24b detect oscillations of the antenna 10b relative to the spacecraft 12b as indicated by the double-headed arrows 26b. Further, a deformation sensor 27b is coupled to the base of the feed tower 16b and strain sensors 29b are interposed along the cables 20b for detecting the oscillations 26b.

In the embodiment illustrated in FIG. 4, a plurality motion control elements 28b are interposed along critical load paths of the antenna 10b. More specifically, the motion control elements 28b are interposed in parallel along select guidelines 20b between the antenna base 14b and the remote portions 22b of the antenna 10b. Also, at least one other motion control element 28b is interposed between the antenna base 14b and the spacecraft 12b. The motion control elements 28b alter the amplitude of the antenna 10b which effectively reduces oscillating motion settling time.

For active control of the damping characteristics of the motion control elements 28b, the motion control elements 28b preferably are of the type including a fluid therein such as a visco-elastic fluid, an electro-rheological fluid, a magneto-rheological fluid, or a combination thereof or a PZT stack as described above with reference to FIG. 1. A power source 30 is electrically coupled to the motion control elements 28b. The power source 30 communicates with one or more of the sensors 24b, 27b and/or 29b by telemetry or a conventional wiring harness. The remote sensors 24b, 27b and/or 29b provide electrical signals to the microprocessor 31 indicative of the oscillating conditions experienced by the antenna 10b. In response to the signals from the remote sensors 24b, 27b and/or 29b, i.e., feedback, the microprocessor 31 provides output signals to control the power source 30. The power source 30 varies the magnitude of the voltage transmitted to the motion control elements 28b in response to the signals from the sensors 24b, 27b and/or 29b. By controlling the power source 30, the damping characteristics of the motion control element 28b are increased or decreased according to the changes in voltage applied thereto.

The motion control element 28b may also be operated in a passive-damping configuration. In this mode, the sensors 24b, 27b and/or 29b are unnecessary and are preferably eliminated. Further, the motion control element 28b preferably includes a fluid therein in the form of an electro-rheological fluid, a magneto-rheological fluid, a visco-elastic fluid, or a combination thereof. In this case, permanent magnets or a coil receiving constant voltage from the power source 30 provides a constant magnitude of voltage to the motion control elements 28b to counter the oscillating 26b of the antenna 10b. As such, the fluid in the motion control elements 28b maintains a constant, preselected viscosity and the motion control elements 28b provide a constant preselected damping effect.

Thus, the present invention provides a motion control apparatus for damping spacecraft appendage oscillation. More particularly, the present invention interposes motion control elements in strategic locations within the appendage structure to damp oscillations. In one embodiment, the motion control elements utilize a fluid having its viscosity changed according to the magnitude of an electric or magnetic field applied thereto. In another embodiment, the motion control elements utilize a piezo-electric element which exerts mechanical forces proportional to the magnitude of an electric charge supplied thereto. In yet another embodiment, the motion control elements passively control oscillations by utilizing a fluid having its viscosity fixed through the use of permanent magnets or a constant electric or magnetic source. Although the present invention is particularly well suited for spacecraft appendage applications such as antennas, the present invention may also be beneficial in seismic vibration isolator systems for buildings, bridges, pipe and gas lines, aircraft and ships.

Those skilled in the art can now appreciate from the foregoing description that the road teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. An apparatus comprising;
   a platform;
   an antenna coupled to said platform, said antenna including a tower member extending substantially laterally away from said platform, a plurality of ribs radially projecting from said tower member to form a dish-shaped structure, and a plurality of guidelines extending between said tower member and remote portions of said dish-shaped structure spaced apart from said tower member; and
   a motion control element interposed along at least one load path between said antenna and said platform to reduce an oscillation settling time of said antenna relative to said platform, said motion control element having a material disposed therein with a motion control property which is variable according to a magnitude of a power source coupled thereto.

2. The apparatus of claim 1 wherein said property further comprises a viscosity of a fluid disposed within said motion control element.

3. The apparatus of claim 2 wherein said fluid further comprises one of the group including visco-elastic fluid, magneto-rheological fluid, electro-rheological fluid and combinations thereof.

4. The apparatus of claim 1 wherein said motion control property further comprises a dimension of said material disposed within said motion control element.

5. The apparatus of claim 4 wherein said material further comprises piezo-electric elements.

6. The apparatus of claim 1 further comprising:

at least one sensor coupled to said antenna for detecting oscillations thereof, said sensor communicating with said power source for varying a voltage delivered to said motion control element to vary said motion control property.

7. The apparatus of claim 6 wherein said sensor further comprises one of the group including an accelerometer, a deformation sensor and a strain sensor.

8. The apparatus of claim 1 wherein said load path further comprises a location between a base of said tower member of said antenna and said platform.

9. The apparatus of claim 1 wherein said load path fiber comprises a location along at least one of said guidelines coupled between said tower member and said dish-shaped structure.

10. An apparatus comprising:

a platform;

an antenna coupled to said platform, said antenna including a tower member extending substantially laterally away from said platform and a plurality of ribs radially projecting from said tower member to form a dish-shaped structure;

a plurality of guidelines coupled between said tower member and remote portions of said dish-shaped structure spaced apart from said tower member; and at least one motion control element interposed along at least one of said guidelines between said tower member and said remote potions of said dish-shaped structure to reduce an oscillation settling time of said antenna relative to said platform, said motion control element having a material disposed therein with a motion control property which is variable according to a magnitude of a power source coupled thereto.

11. The apparatus of claim 10 wherein said motion control property further comprises a viscosity of a fluid disposed within said motion control element.

12. The apparatus of claim 11 wherein said fluid further comprises one of the group including visco-elastic fluid, magneto-rheological fluid, electro-rheological fluid and combinations thereof.

13. The apparatus of claim 10 wherein said motion control property further comprises a dimension of said material disposed within said motion control element.

14. The apparatus of claim 13 wherein said material further comprises piezo-electric elements.

15. The apparatus of claim 10 further comprising:

at least one sensor coupled to said antenna for detecting oscillations thereof, said sensor communicating with said power source for varying a voltage delivered to said at least one motion control element to vary said motion control property.

16. The apparatus of claim 15 wherein said sensor further comprises one of the group including an accelerometer, a deformation sensor and a strain sensor.

17. An apparatus comprising:

a platform;

an antenna coupled to said platform, said antenna including a tower member secured to said platform at a base so as to extend substantially laterally away from said platform and a plurality of ribs radially projecting from said tower member to form a dish-shaped structure;

a plurality of guidelines coupled between remote portions of said dish-shaped structure and said tower member; and a plurality of motion control elements for reducing an oscillation settling time of said antenna relative to said platform, at least one of said motion control elements interposed between said base of said tower member and said platform and at least one other of said motion control elements interposed along at least one of said guidelines between said tower member and said remote portions of said dish-shaped structure, said plurality of motion control elements having a material disposed therein with a motion control property which is variable according to a magnitude of a power source coupled thereto.

18. The apparatus of claim 17 wherein said motion control property further comprises a viscosity of a fluid disposed within said motion control elements.

19. The apparatus of claim 18 wherein said fluid further comprises one of the group including visco-elastic fluid, magneto-rheological fluid, electro-rheological fluid and combinations thereof.

20. The apparatus of claim 17 wherein said motion control property further comprises a dimension of said material disposed within said motion control elements.

21. The apparatus of claim 20 wherein said material further comprises piezo-electric elements.

22. The apparatus of claim 17 further comprising:

at least one sensor coupled to said antenna for detecting oscillations thereof, said sensor communicating with said power source for varying a voltage delivered to said motion control elements to vary said motion control property.

23. The apparatus of claim 22 wherein said sensor further comprises one of the group including an accelerometer, a deformation sensor and a strain sensor.

* * * * *